United States Patent [19]

Bandoh

[11] Patent Number: 4,511,317
[45] Date of Patent: Apr. 16, 1985

[54] APPARATUS FOR ENCLOSING SEMICONDUCTORS WITH RESIN BY MOLDING

[76] Inventor: Kazuo Bandoh, No. 81-8, Toyama, Momoyama-cho, Fushimi-ku, Kyoto-shi, Japan

[21] Appl. No.: 446,699

[22] Filed: Dec. 3, 1982

[30] Foreign Application Priority Data

Dec. 7, 1981 [JP] Japan ................. 56-182748

[51] Int. Cl.[3] ............................................. B29G 3/00
[52] U.S. Cl. ..................... 425/116; 29/588;
264/272.17; 264/328.4; 425/121; 425/125; 425/444; 425/DIG. 228
[58] Field of Search ............ 264/272.17, 328.4, 328.5, 264/328.9, 161, 328.2, 328.8; 425/116, 121, 127, 544, 561, DIG. 228, 444, 125; 29/588

[56] References Cited

U.S. PATENT DOCUMENTS

| 2,428,275 | 9/1947 | Frankwich et al. | 425/116 |
|---|---|---|---|
| 2,463,401 | 3/1949 | Lyons | 425/544 |
| 3,672,046 | 6/1972 | Storey et al. | 29/588 |
| 4,347,211 | 8/1982 | Bandoh | 264/328.4 |
| 4,386,898 | 6/1983 | Sera | 425/544 |

FOREIGN PATENT DOCUMENTS 2454927  5/1976  Fed. Rep. of Germany ...... 425/127

OTHER PUBLICATIONS

"Runnerless Molding Without Hangups", Csaszar, *SPE Journal,* Feb. 1972, vol. 28, No. 2, pp. 20-23.

*Primary Examiner*—James Lowe
*Attorney, Agent, or Firm*—Larson and Taylor

[57] ABSTRACT

Apparatus for enclosing semiconductors with resin by molding, including a stationary upper mold having a plurality of pots, and a movable lower mold opposed thereto.

The upper and lower molds have cavities to which a resin material supplied to the pots is pressingly injected directly or only through gates.

Disposed at the upper mold side is a resin material pressurizing mechanism having plungers fittable into the pots, and one or more cylinders and piston rods for actuating the plungers.

3 Claims, 9 Drawing Figures

FIG. 2
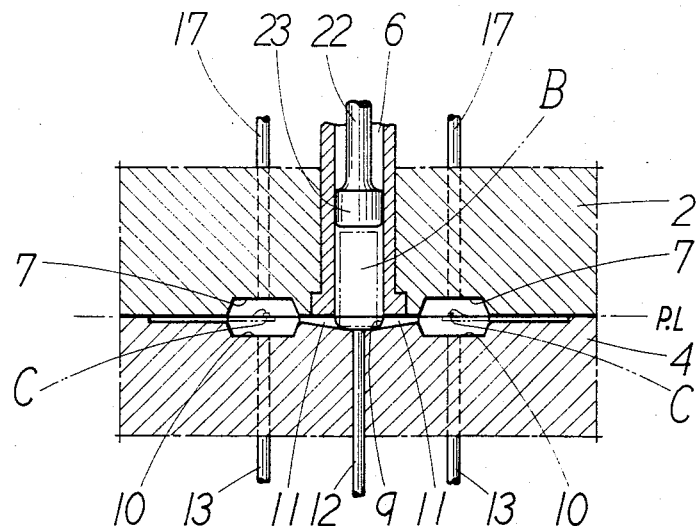
FIG. 3
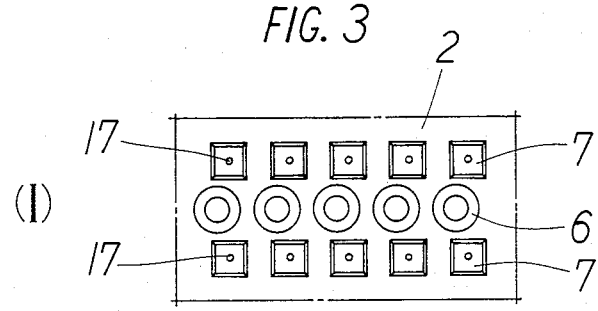
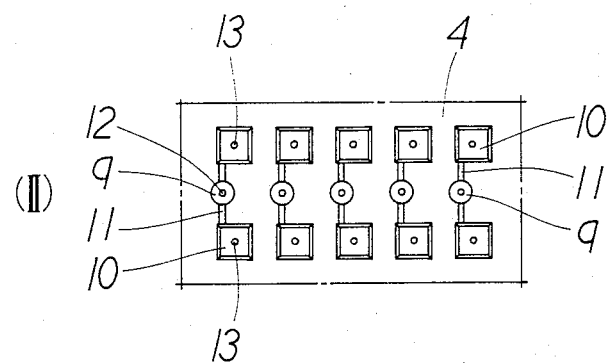

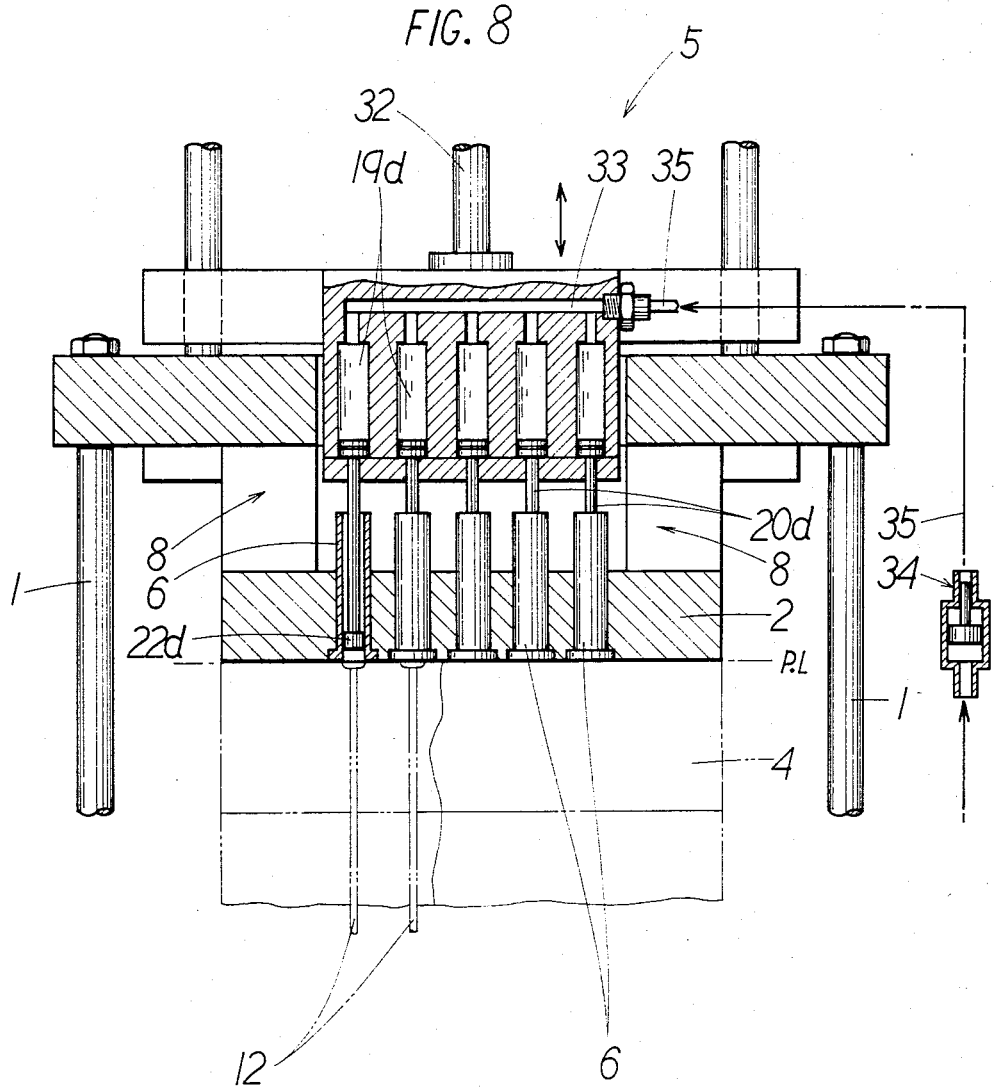

APPARATUS FOR ENCLOSING SEMICONDUCTORS WITH RESIN BY MOLDING

BACKGROUND OF THE INVENTION

Conventionally, when semiconductors are to be enclosed with resin by molding, lead frames carrying semiconductor chips are set in place between the parting line surfaces or fitting surfaces of the upper and lower molds, and the molds are thereafter clamped together. A preheated resin material, such as epoxy resin or like thermosetting synthetic resin is fed to a single large pot in the center of one of the molds and plasticized in the pot by being subjected to pressure with a plunger. The plasticized material is pressingly injected into the cavities through the main runners, auxiliary runners and gates, and is molded with semiconductor chips enclosed with portions of the material.

In such molding apparatus, the distances between the pot and the cavities are long and different from each other. With the passage of time, therefore, thermosetting of the resin is inevitably accelerated with different thermosetting degrees in the resin flow course. It is therefore difficult to obtain molded articles of a constant quality with a good molding efficiency.

In order to eliminate such disadvantage, the pressure of injecting the resin from the pot may be increased to provide a higher resin flow speed. In such a case, however, the resin flow pressure into the cavities becomes too strong, thereby disadvantageously to break or deform fine metallic conductors or the like attached to the semiconductor chips.

Moreover, the main runners, auxiliary runners and gates are also charged with the resin material used. This entails a serious loss of resin material not used for molded articles, thus disadvantageously affording a reduced yield.

Since the resin material is thermosetting and is therefore not reusable, the waste of the material results in a great economical loss.

In order to eliminate the above-mentioned disadvantages, the inventor of the present invention has successfully proposed an apparatus for enclosing a pluraltiy of semiconductors with resin by molding at the same time with the use of molds having a plurality of cavities and pots, by injecting under pressure a resin material supplied to the pots, to the respective cavities only through the gates, or directly without passing the material through the main runners, auxiliary runners and gates.

In the molding apparatus above-mentioned, a movable lower mold opposed to a stationary upper mold has a plurality of pots into which plungers are fittingly inserted, and a resin material feed port is opened to the mold suface of the lower mold. When a resin material is to be fed into the pots with the hand, it is necessary to feed a resin material with the hand inserted between the opened upper and lower molds. Such feed operation may be attended with danger that the operator gets burnt in the hand with the hand touching the heated molds, or that the hand is caught in the molds in case the molds are unexpectedly clamped during the material feed operation.

In such molding apparatus, it is necessary to dispose a plunger lifting/lowering mechanism at the lower mold side, in addition to the lower mold lifting/covering mechanism. The construction becomes therefore very complicated at the lower mold side. Accordingly, assembling and disassembling of the entire molding apparatus become troublesome and difficult, resulting in difficult maintenance and checking of the parts.

SUMMARY OF THE INVENTION

The present invention relates to an apparatus for enclosing semiconductors with resin by molding, and more particularly to improvements in an apparatus for enclosing a plurality of molded articles at the same time with the us of molds having a plurality of cavities and pots disposed in proximity or directly opposed to the cavities, by injecting under pressure a resin material supplied to the pots, into the cavities directly or only through the gates.

It is an object of the present invention to provide a molding apparatus in which the resin material flow distances between the pots and cavities are shortened to greatly reduce the waste of the resin material remaining at other portions than the cavities, thereby to economically enclosing semiconductors with resin by molding with an increased yield.

It is another object of the present invention to provide a molding apparatus in which the resin material flow distances between the pots and cavities are shortened and made equal to prevent thermosetting of a resin material from being accelerated in the resin flow course, as well as to provide molded articles of uniform quality, so that the molding period of time is shortened with the molding efficiency improved. The resin material injecting pressure is properly maintained, thereby to prevent adverse effects to parts attached to the semiconductors which are otherwise resulted from an excessive injecting pressure.

It is a further object of the present invention to provide a molding apparatus capable of ensuring a safe molding operation without a risk of burn or other unexpected accidents often taken place when a resin material is fed to the pots in a conventional molding apparatus of the type having a plurality of pots.

It is a still further object of the present invention to provide a molding apparatus which can be easily assembled, disassembled, checked and repaired; such assembling, disassembling, checking and repairing having been hitherto disadvantageously difficult due to the complicated structure of a conventional molding apparatus of the type having a plurality of pots.

The present invention provides a molding apparatus for enclosing semiconductors with resin by molding, including a stationary upper mold provided with a plurality of pots, and a movable lower mold opposed thereto, and characterized in that each of the pots is disposed so as to communicate with a desirable number of cavities among a plurality of cavities formed in the mold surfaces without through main and auxiliary runners, plungers for pressurizing a resin material are fittable into the pots, and a resin material pressurizing mechanism is disposed at the upper mold side.

According to the molding apparatus of the present invention, a resin material supplied to the pots are pressingly injected into the cavities without passing through the main and auxiliary runners. The waste of the resin material can be therefore reduced by the amount otherwise needed for filling the main and auxiliary runners, thus economically enclosing semiconductors with resin by molding with a yield greatly improved.

According to the molding apparatus of the present invention, the resin material flow distances are shortened thereby to provide a rapid and efficient molding operation. Furthermore, since thermosetting of resin is not accelerated, it is not necessary to increase the resin material flow speed. This enables to properly maintain the pressure of flowing a resin material into the cavities, thereby to securely prevent breakage or damage of parts attached to the semiconductors, which is otherwise provoked by an excessive flowing pressure. Thus, molded articles of a uniform quality can be obtained.

According to the molding apparatus of the present invention, a resin material is fed to the pots from above the stationary upper mold. Therefore, as compared with a conventional molding apparatus in which a resin material is supplied between the upper and lower molds with the hand inserted therebetween, such material feeding of the present invention reduces the danger of a burn on the hand and provokes no possibility of the hand being unexpectedly caught between the upper and lower molds, so that a safe resin material feed can be assured.

According to the molding apparatus of the present invention, the resin material pressurizing mechanism is disposed at the upper mold side. Assembling and disassembling or the entire molded apparatus, and maintenance and checking of the parts thereof can therefore be made in a manner easier than done in a conventional molding apparatus in which the lower mold lifting/lowering mechanism and the resin material pressurizing mechansim are both disposed at the lower mold side.

BRIEF DESCRIPTION OF THE DRAWINGS

FIG. 2 is an enlarged section view of main portions of molding apparatus in accordance with the present invention with the molds clamped;

FIG. 3-I is a bottom view of main portions of the mold surface of an upper mold;

FIG. 3-II is a plan view of main portions of the mold surface of a lower mold;

FIGS. 4-8 are views illustrating another examples of a resin material pressurizing mechanism;

FIGS. 4, 5 and 8 are front views, with portions in longitudinal section, of main portions of the upper molds and the pressurizing mechanisms;

FIG. 6 is a front view, with portions in longitudinal section, of main portions of the pressurizing mechanism; and FIG. 7 is a plan view of FIG. 6.

DETAILED DESCRIPTION OF THE PREFERRED EMBODIMENTS

The description hereinafter will discuss in detail the present invention with reference to the accompanying drawings.

Figure 1:
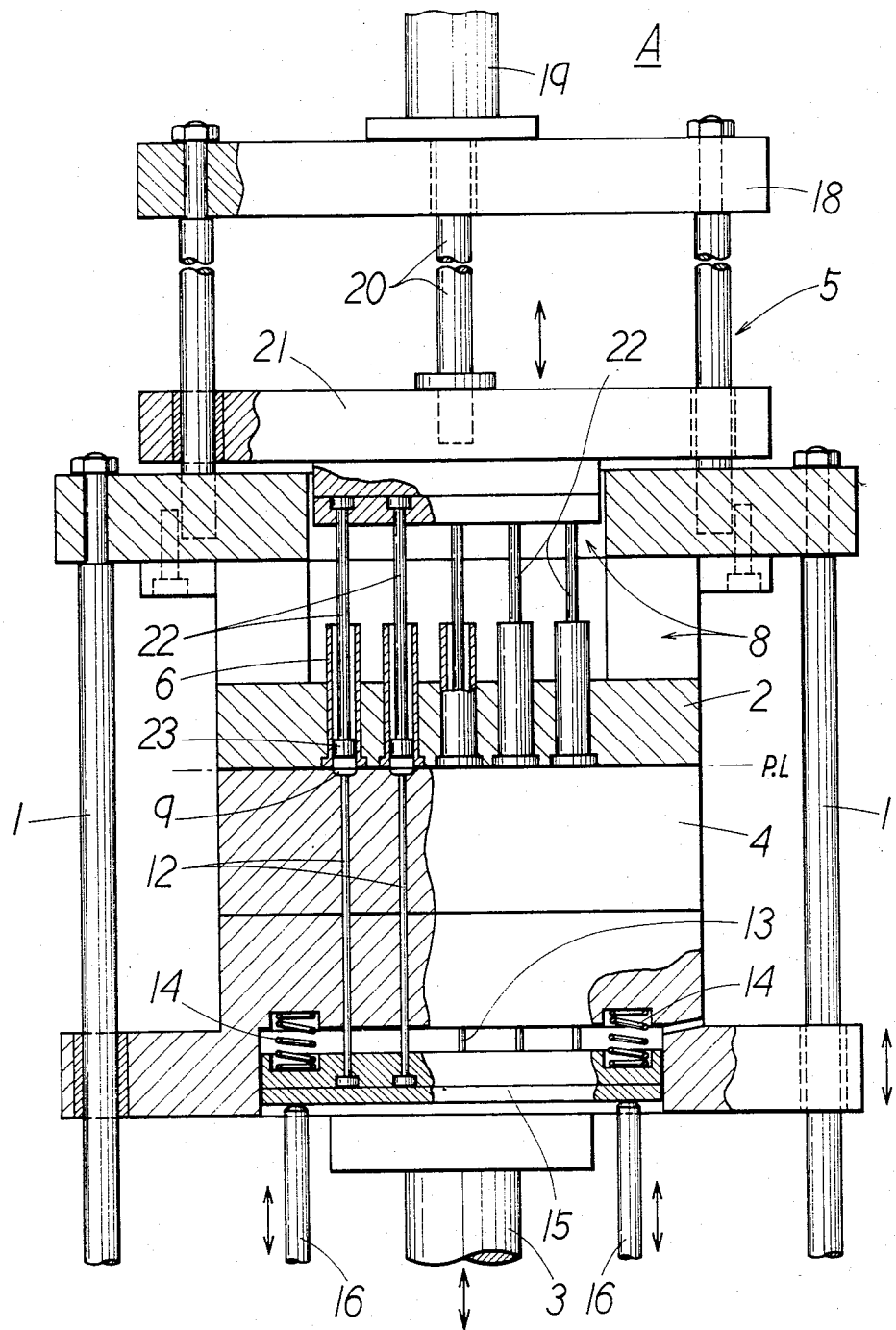
FIG. 1 is a schematic front view, with portions in longitudinal section, of molding apparatus in accordance with the present invention.

FIGS. 1 to 3 illustrate a molding apparatus A for enclosing semiconductors with resin by molding. The molding apparatus A comprises a stationary upper mold 2 supported by a plurality of supports 1, a movable lower mold 4 to be vertically movable by a lifting/lowering mechanism 3, and a resin material prssurizing mechanism 5 at the upper mold side.

The upper mold 2 is provided with a plurality of pots 6 for supplying a resin material, a cavities 7 in proximity to and at the both sides of the pots 6 in the parting line surface of the upper mold 2 with respect to the lower mold 4. The upper mold 2 has an open space 8 for supplying a resin material B into the pots 6.

The lower mold 4 is provided, in the parting line surface thereof with respect to the upper mold 2, with cull portions 9 and cavities 10, respectively, corresponding to the pots 6 and cavities 7 of the uper mold 2. Disposed between the cull portions 9 and cavities 10 are gates 11 for injecting under pressure a resin material heated and plasticized in the pots 6 and the cull portions 9, into the upper and lower cavities 7 and 10. Thus, the pots communicate with the cavities only through the gates.

Ejector pins 12 and 13 used for releasing molded articles from the mold are fitted in the curl portions 9 and the lower mold cavities 10. The ejector pins 12 and 13 are secured, at the base portions thereof, to an ejector plate 15 downwardly spring-loaded by the resiliency of a pushing-down spring 14. Accordingly, the tips of the ejector pins 12 and 13 do not project into the cull portions 9 and the lower mold cavities 10 when the upper and lower molds 2 and 4 are clamped. When the molds 2 and 4 are opened, the ejector plate 15 are adapted to be upwardly moved by an ejector bar 16 is disposed under the ejector plate 15. The tips of the pins 12 and 13 will then be projected from the parting line against the resiliency of the spring 14.

Ejector pins 17 are disposed in the upper mold cavities 7. The ejector pins 17 are constructed such that their lower ends will not project into the cavities 7 when the molds are clamped, and will downwardly project from the parting line when the molds are opened, by means of a mechanism (not shown) similar to that for the ejector pins 12 and 13 in the lower mold 4.

The resin material pressurizing mechanism material 5 has a cylinder 19 secured to the center of a frame 18 on the upper mold 2, a piston rod 20 vertically movable by the pressure of oil or the like pressingly sent into the cylinder 19, a plunger mounting frame 21 secured to the lower end of the piston rod 20 and vertically movable together therewith, and a plurality of plungers 22 secured to the plunger mounting frame 21.

The plungers 22 are disposed so as to be fittingly inserted into the pots 6 of the upper mold 2. When a downward force is exerted to the piston rod 20, the lower ends 23 of the plungers 22 are adapted to be fittingly inserted into the pots 6 to pressurize a resin material B supplied to the pots 6.

The description hereinafter will discuss how to enclose semiconductors with resin by molding according to the molding apparatus discussed hereinbefore.

With the lower mold 4 downwardly moved by the lifting/lowering mechanism 3, the molds are opened and the plungers 22 in the resin material pressurizing mechanism 5 are upwardly moved. With the lead frames C having semiconductor chips set between the parting line surfaces of the upper and lower molds 2 and 4, the molds 2 and 4 are clamped. A resin material B is then suitably supplied to the pots 6 from the upper mold side open space 8. The resin material is heated by the molds 2 and 4, and the plungers 22 are downwardly moved to pressurize the resin material by the lower ends 23 of the plungers 22. The resin material is then melted and injected under pressure into the cavities 7 and 10 through the gates 11, thereby to enclosingly mold the semiconductor chips on the lead frames C in the cavities with resin. Thereafter, the molds are opened, and the ejector plate 15 and the ejector pins 12 and 13 are upwardly moved by the ejector bar 16 at the lower mold side. Simultaneously, the ejector pins 17 at the upper mold side are downwardly moved. The resin molded articles are then released from the upper mold cavities 7 and the lower mold cavities 10, thus completing one cycle of the enclosingly molding operation.

In the embodiment discussed hereinbefore, the pressurizing mechanism 5 is so constructed as to vertically move a plurality of plungers 22 at the same time by one cylinder 19 and one piston rod 20. However, the pressurizing mechanism 5 may be constructed as shown in FIGS. 4 to 8, in order to obtain uniformly molded articles with the plungers forces for pressurizing the resin material uniformly maintained, even though different amounts of resin material are supplied to the pots.

Figure 4:
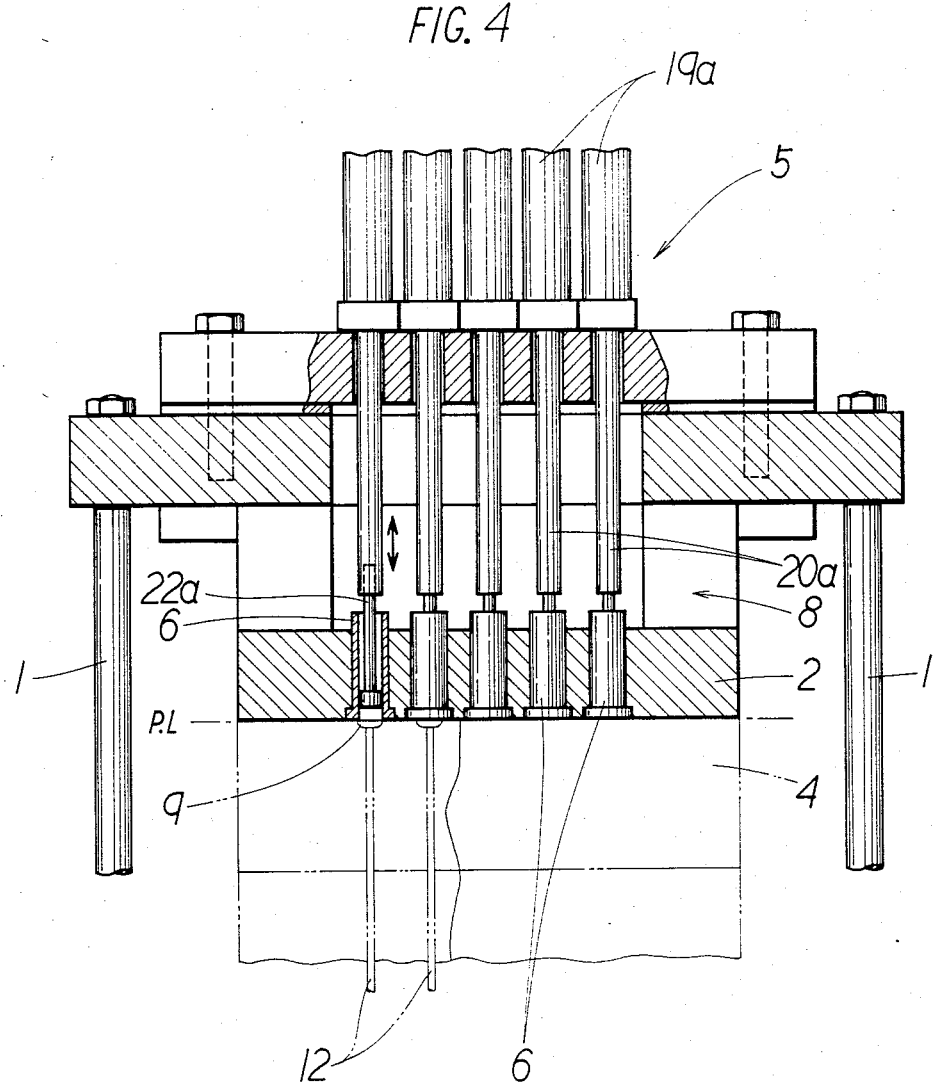

The pressurizing mechanism 5 in FIG. 4 has cylinders 19a and piston rods 20a equal in number to the number of the pots 6. Plungers 22a are secured to the lower ends of the piston rods 20a. There is disposed a mechanism (not shown) for pressingly supplying a vertically moving force, such as a hydraulic pressure, into the respective cylinders 19a.

According to such pressurizing mechanism, it is thus possible to uniformly maintain the pressurizing forces of the respective plungers 22a exerted to the resin material supplied into the pots 6.

Figure 5:
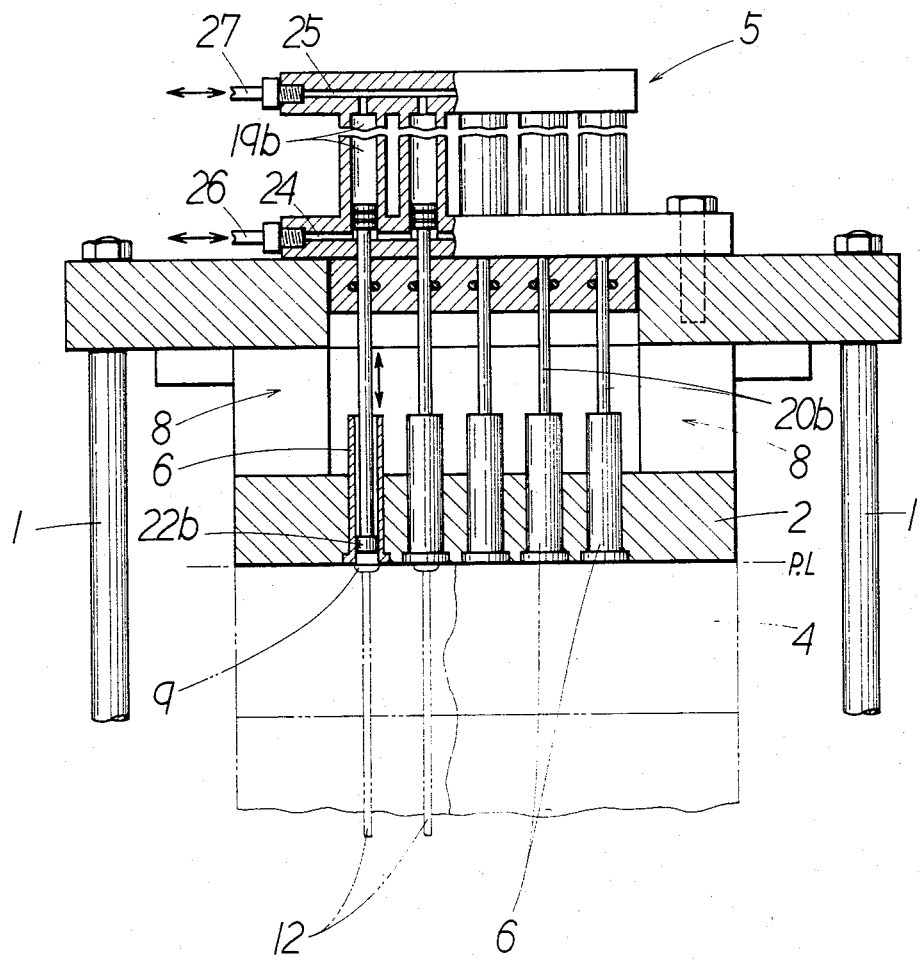

The pressurizing mechanism 5 in FIG. 5 has cylinders 19b formed in a unit structure.

Common oil channels 24 and 25 for vertically moving piston rods 20b and plungers 22b communicate with the respective cylinders 19b. The oil channels 24 and 25 are respectively connected to pipes 26 and 27 for supplying oil.

According to the pressurizing mechanism 5 in FIG. 5, it is thus possible to uniformly maintain the pressurizing forces of the respective plungers 22b exerted to the resin material in the pots. It is also possible to improve the durability of the cylinder mechanism and to simplify the whole structure with the number of the oil supply pipes reduced.

Figure 6:
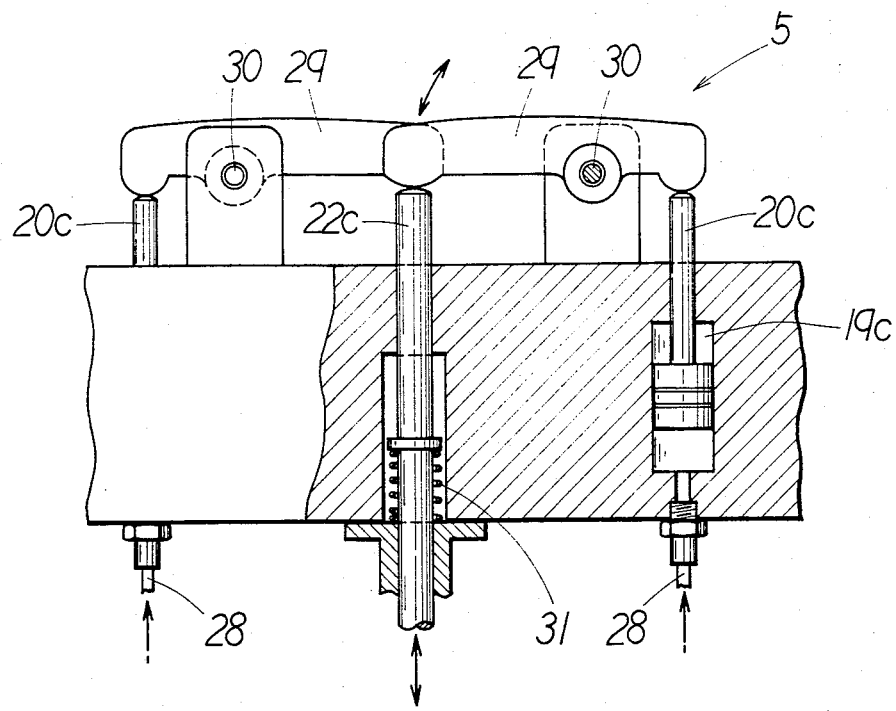
Figure 7:
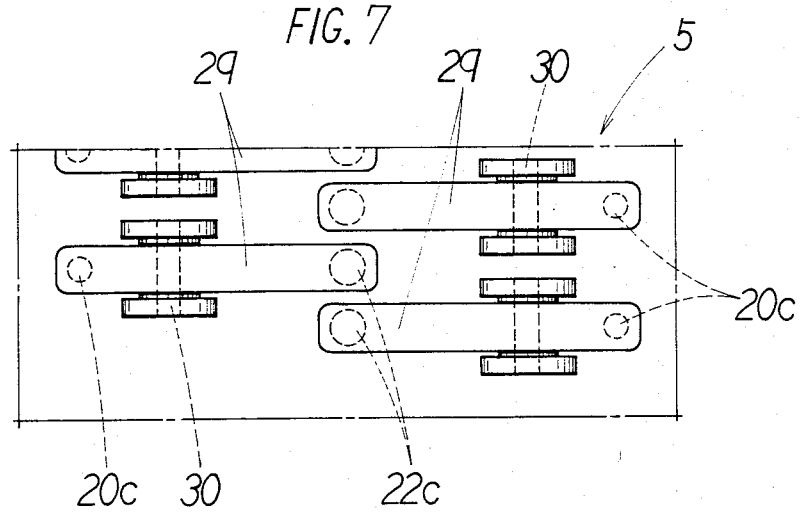

The pressurizing mechanism 5 in FIGS. 6 and 7 is proposed to facilitate the mounting of the cylinders for vertically moving the plungers, which is difficult due to the narrow distances between the plungers 22a in the pressurizing mechanism in FIG. 4.

In the pressurizing mechanism 5 in FIG. 6, a plungers 22c are disposed separately from cylinders 19c and piston rods 20c for pushing down the plungers 22c by the pressure of oil supplied from oil supply pipes 28. A rocker arm 29 is disposed between the upper ends of each plunger 22c and each piston rod 20c, and is supported by a swing shaft 30. Disposed around the shaft portion of each plunger 22c is a spring 31 for pushing up the plunger 22c.

According to the pressurizing mechanism 5 in FIG. 6, it is thus possible to uniformly maintain the pressurizing forces of the respective plungers 22c exerted to the resin material in the pots. It is also possible to smoothly arrange the cylinders 19c without any spatial difficulty.

According to the pressurizing mechanism 5 in FIG. 8, an integrally constructed cylinder mechanism is vertically movably secured to the lower end of a piston rod 32 which is vertically movable by a vertical moving force of a hydraulic cylinder (not shown). A common oil channel 33 for pushing down piston rods 20d and plungers 22d communicates with cylinders 19d. This common channel 33 is connected to an oil supply pipe 35 having a suitable booster mechanism 34. Provision is made such that a uniform oil pressure is exerted to the respective cylinders 19d, all the time or before the resin material in the pots 6 is pressurized.

According to this pressurizing mechanism 5 in FIG. 8, it is thus possible to uniformly maintain the pressurizing forces of the respective plungers 22d exerted to the resin material in the pots 6. It is also possible that the plungers 22d absorb an excessive pressure exerted when the resin material is pressurized. Such absorption enables the melted resin injecting pressure to be maintained constant, thereby to provide molded articles of a uniform quality and to prevent the plungers from being broken.

It is to be noted that like parts in FIGS. 4 to 8 are designated by like reference numerals used in FIGS. 1 to 3.

The description has been made on the molding apparatus in which the pots communicate with the cavities only through the gates. However, the molding apparatus of the present invention may also be constructed with the pots facing directly to the cavities. According to such construction, the waste of resin used may be further reduced, thereby to further improved the economical effect of the present invention.

The present invention is not limited to the embodiments which have been discussed and illustrated by way of example, and all modifications and variations may be included therein without departing from the attached claims.

What we claim is:

1. An apparatus for enclosing semiconductors with resin by molding comprising a stationary upper mold and a movable lower mold opposed thereto, a plurality of cavities formed in the mold surfaces of said upper and lower molds, a pluraltiy of pots in said upper mold, each of said pots being disposed so as to communicate with a predetermined number of said cavities without through main and auxiliary runners and including openings at the uper end thereof for receiving the resin, a plunger in each of said pots for pressurizing the resin received in the associated pot and for forcing the pressurized resin into said cavities and a resin material pressurizing mechanism disposed above said upper mold, said resin material pressurizing mechanism comprising a plurality of pistons and cylinders individual to but separate from said plungers and a like plurality of rocker arms disposed between individual pairs of said pistons and plungers for transmitting movement of a said piston into movement of the corresponding plunger, said cylinders being connected to individual channels for a fluid pressure medium, said plungers being arranged in a row in a plunger mounting frame and said cylinders being formed in said plunger mounting frame and arranged in two rows in staggered relationship on opposite sides of the row of plungers, sad rocker arms being located between the associated piston and plunger such that the opposite ends of each rocker arm contact the upper ends of the associated piston and plunger, and said rocker arms being mounted on swing shafts arranged in staggered rows on opposite sides on the row of plungers, said apparatus further comprising a plurality of biasing springs, located in the plunger mounting frame and individually associated with a corresponding one of said plungers, for biasing said plungers upwardly to an inoperative position thereof.

2. Apparatus for enclosing semiconductors with resin by molding as defined in claim 1, wherein each of the pots is disposed so as to communicate, only through gates, with a predetermined number of cavities among a plurality of cavities formed in the mold surfaces.

3. Apparatus for enclosing semiconductors with resin by molding as defined in claim 1, wherein each of the pots is disposed so as to communicate directly with a predetermined number of cavities among a plurality of cavities formed in the mold surfaces.

* * * * *